INVENTOR
RENARD P. ADAMS

United States Patent Office 3,476,248
Patented Nov. 4, 1969

3,476,248
SUCTION BACKWASH MEANS FOR A LOW PRESSURE, MULTIPLE ELEMENT, FILTER ASSEMBLY
Renard P. Adams, 87 Nottingham Terrace, Buffalo, N.Y. 14221
Filed Mar. 1, 1968, Ser. No. 709,644
Int. Cl. B01d 35/22
U.S. Cl. 210—153   10 Claims

ABSTRACT OF THE DISCLOSURE

An open top tank has an inlet conduit in communication therewith. An outlet conduit is in communication with a body means having a plurality of filter tubes therein and open at opposite ends to the tank. Rotatable backwash means is associated with the ends of the filter tubes for sequentially backwashing the tubes as required. Seal plate means is provided around the ends of the backwash sleeve portions to prevent bypassing of liquid and to isolate one tube at a time. Eductor means is connected in the backwash means for inducing a vacuum which draws liquid through the tube being backwashed into the backwash means. The entire outlet portion is immersed in liquid during operation of the apparatus.

BACKGROUND OF THE INVENTION

The liquid filtering apparatus of the present invention is particularly adapted for use in what is normally termed the primary filtration service serving municipalities wherein the maximum amount of solids are removed from the liquid such as water before the water passes into a coagulating basin or sand filter for further clarification. The apparatus of the present invention may also serve as the sole source of straining on potable water in removing fine degree solids down to 12 microns. The structure of the present invention is designed for atmospheric surface, and represents an improvement over the structure as shown for example in U.S. Patent No. 2,462,604.

Such prior art arrangements employ a large rotating drum wherein a portion thereof immersed in an atmospheric tank is permitted to pass water from where it is withdrawn in a strained state. As the drum rotates, that portion thereof rotating above the water level is backflushed by suitable spray so that dirt which has collected on the drum can be removed.

A particular disadvantage of such large rotating drum arrangements as employed in the prior art is that the filter surface thereof is limited, and the structure is bulky and requires a large concrete pit within which the equipment is installed.

SUMMARY OF THE INVENTION

In the present invention, the inlet portion of the apparatus comprises a tank open at the upper portion thereof to atmosphere, the outlet portion being disposed within the tank and immersed within liquid disposed in the tank during operation thereof.

The outlet portion of the structure as well as the backwash means associated therewith is similar to that shown in U.S. Patent No. 3,318,452 wherein a plurality of filter tubes are provided in the outlet portion of the apparatus, and the backwash means is adapted to backwash the tubes in a sequential manner. The apparatus illustrated in this latter-mentioned U.S. patent is designed for use in a pressure system and essentially on the discharge side of a centrifugal pump, and would not be suitable for use in an atmospheric system as the present invention.

The over-all arrangement of the present invention provides a great deal more surface in useful straining service than the single rotating drum as discussed hereinbefore, and additionally, the arrangement of the present invention requires much less space thereby enabling the tank within which the outlet portion is disposed to be of considerably smaller size than that required in the prior art.

Since the liquid in the inlet portion of the apparatus of the present invention is at atmospheric pressure, it is necessary to provide a suction means for producing subatmospheric pressure in the backwash means in order to draw fluid through a filter tube to be backwashed. The suction means may take the form of one or more eductors which are adapted to produce approximately a 20-inch vacuum to thereby develop the differential pressure required for effective backwashing of a filter tube. The solids which are backwashed from a filter tube may be carried to waste. In a typical example, an eductor of 4-inch size supplied with 60 lbs. of water flow will induce a vacuum of about 18 to 20 inches which affords the energy necessary to draw the liquid through a filter tube during backwashing and to induce the backflow in the flushing operation.

As backwashing takes place, the strained water in the strained water compartment of the outlet portion of the apparatus will supply the necessary water to pass back through the tube being backwashed and be conducted out through the backwash tube structure to waste.

The backwash means may be selectively operated as differential pressure develops within the apparatus which will be measured in inches of water. The backwash means will be actuated or rotated at a proper speed, cleaning each filter tube in sequence, until the differential pressure in the apparatus reaches a quiescent point.

A resiliently urged barrel is provided within a longitudinally extending sleeve portion of the backwash means, this barrel being urged into engagement with the inlet portion of the ends of the tubes so as to provide a close sliding fit to prevent leakage of liquid from the raw water or inlet portion of the apparatus into the backwash means.

In addition, seal plate means is provided which surrounds each sleeve portion of the backwash means and is resiliently urged against the adjacent inlet portions of the tubes. This seal plate means serves to blank off the two tubes adjacent to that tube which is being backwashed to such an extent that there will not be any bypass of water from the raw water or inlet portion of the apparatus into either of the two adjacent tubes and thence into the backwash means without doing any effective cleaning work. This arrangement isolates one tube at a time from the backwashing operation and prevents adjacent tubes from bypassing raw water or liquid from the inside bore into the backwash means.

DESCRIPTION OF THE PREFERRED EMBODIMENT

Figure 1:
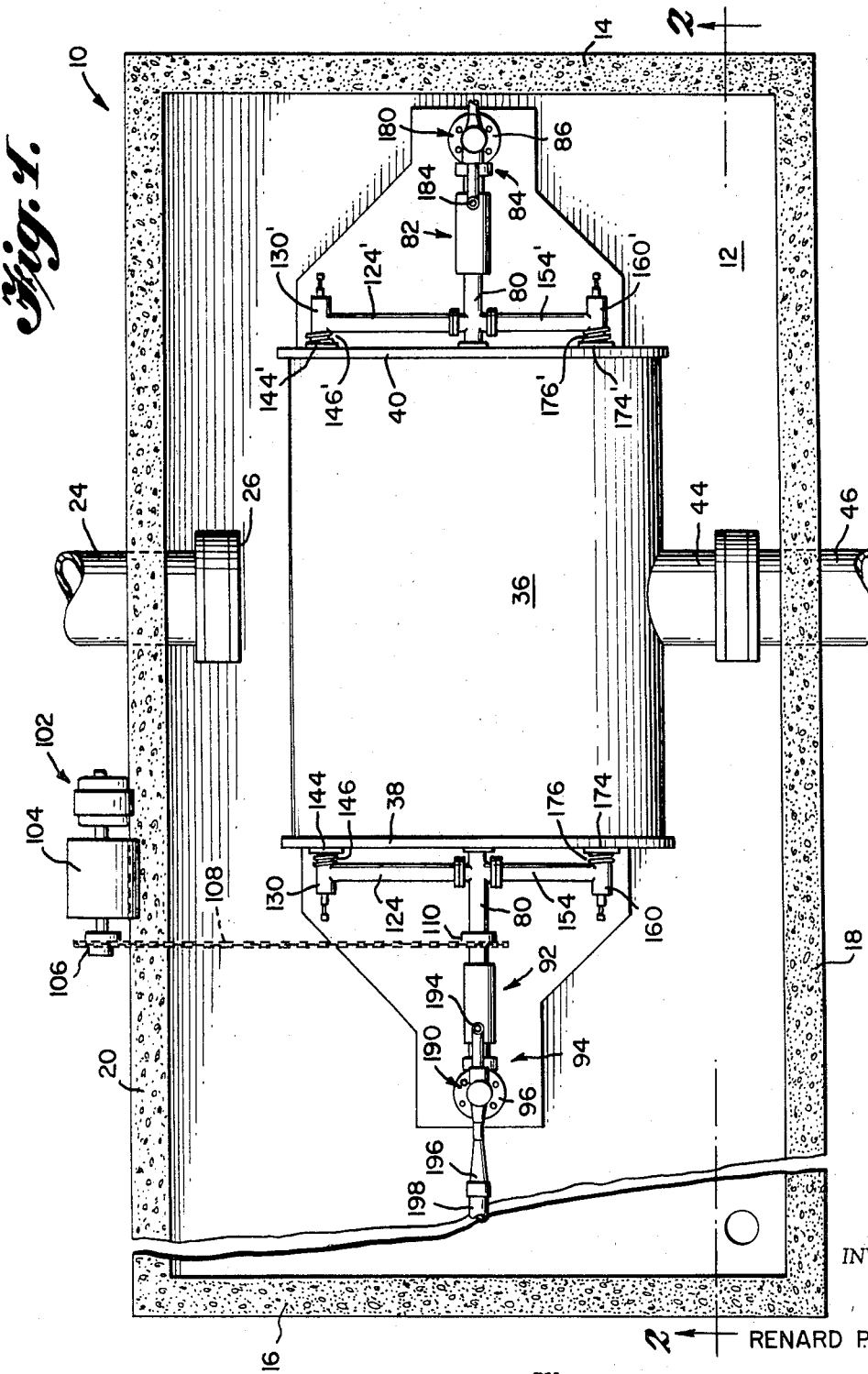
FIG. 1 is a top view of the apparatus according to the present invention, a portion of the structure being broken away.

Referring now to the drawings wherein like reference characters designate corresponding parts throughout the several views, the apparatus of the present invention includes an inlet portion comprising a tank indicated generally by reference numeral 10 formed of a suitable material such as concrete or the like, the tank being open at the upper portion thereof to atmosphere. The tank includes a bottom wall 12, a pair of opposite end walls 14 and 16, and a front and rear wall 18 and 20, the entire upper portion of the tank being open to atmosphere.

Figure 2:
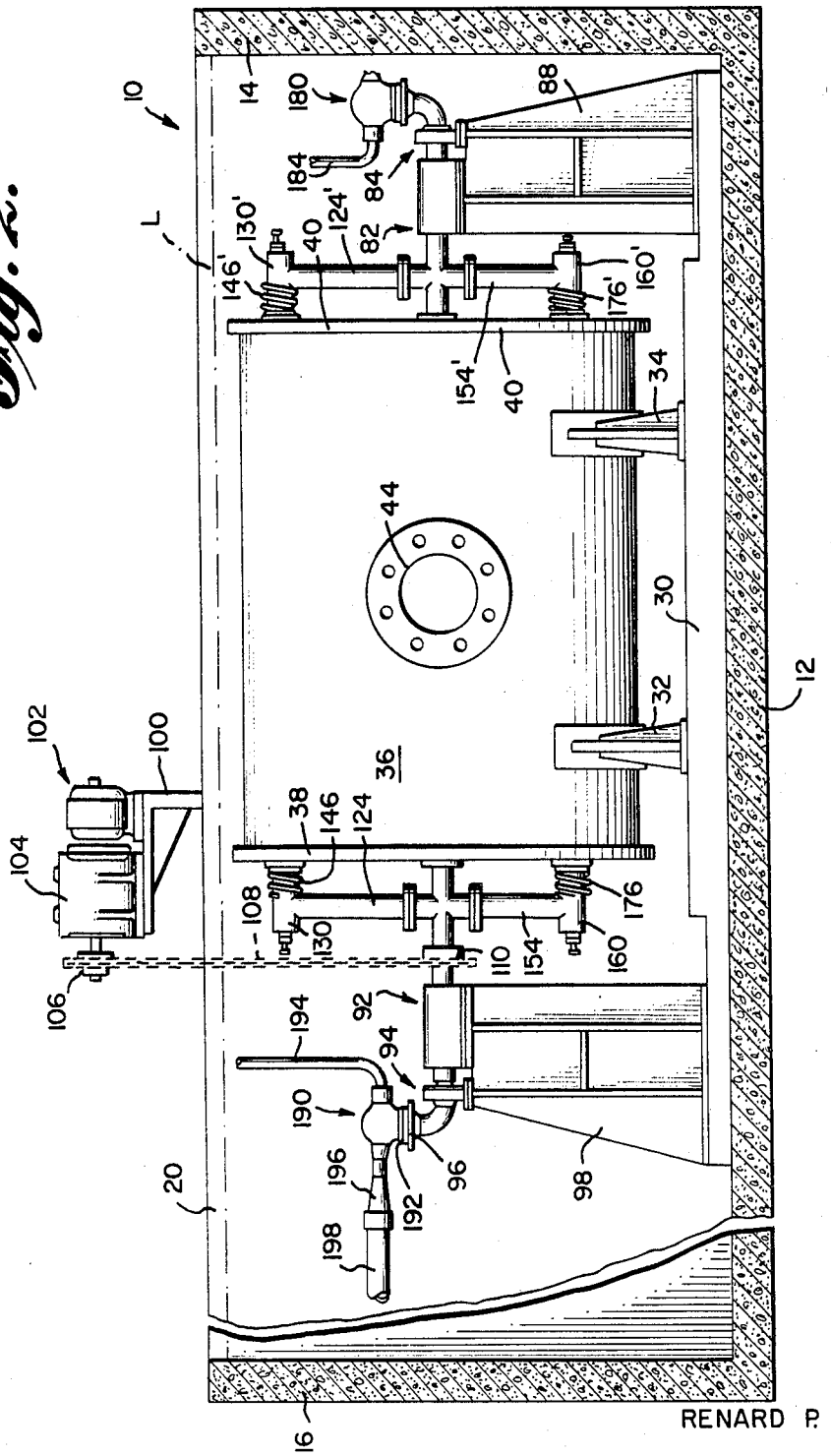
FIG. 2 is a sectional view taken substantially along line 2—2 of FIG. 1 looking in the direction of the arrows.
Figure 3:
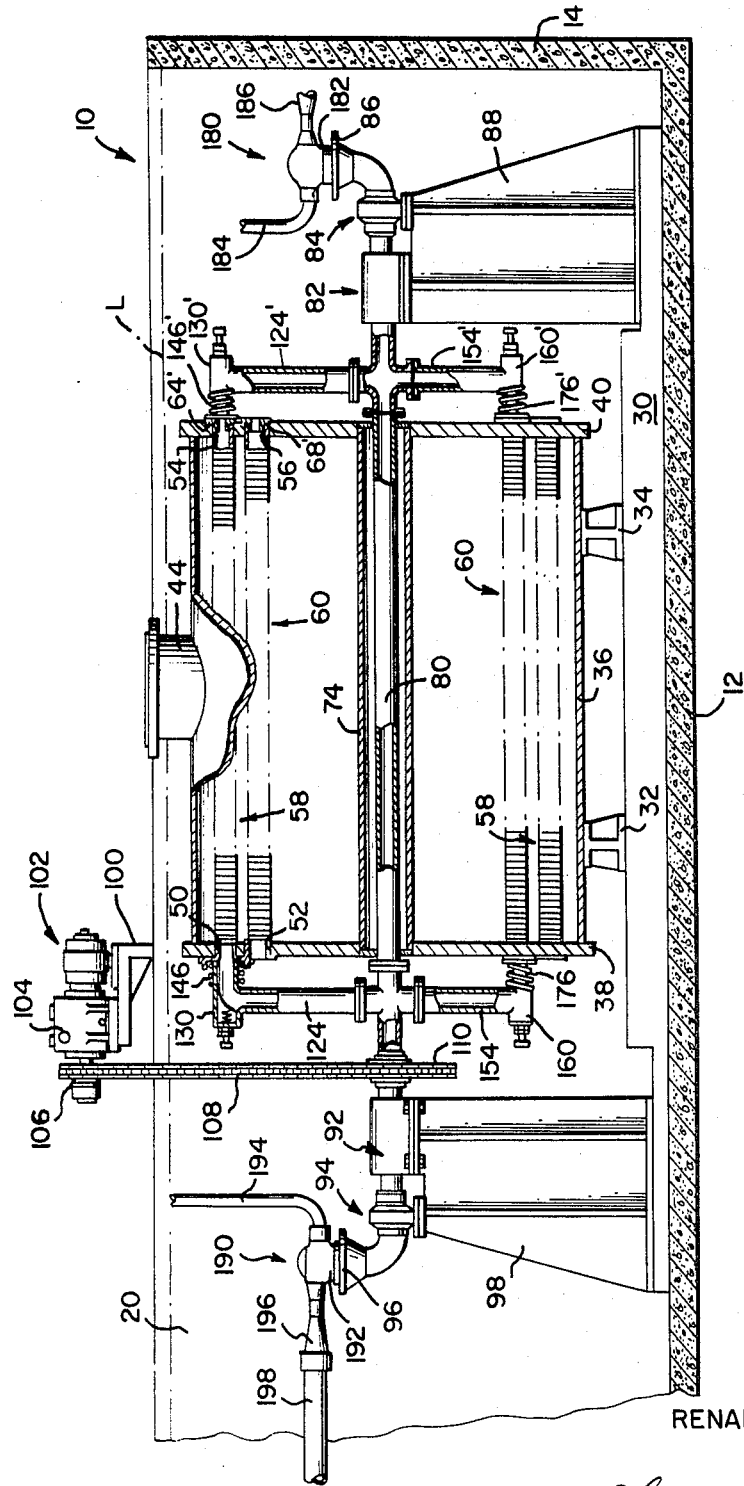
FIG. 3 is a vertical section through the structure.

An inlet conduit 24 is connected with any suitable source of raw water or the like to be filtered, the inlet conduit extending through the wall 20 of the tank and including an open discharge end portion 26 whereby liquid is normally fed into the tank up to the liquid level as indicated by the reference character L in FIGS. 2 and 3.

A base portion 30 which may also be formed of concrete or the like is supported on the upper surface of the bottom wall 12 of the tank. A pair of spaced supports 32 and 34 are mounted on base portion 30, and a generally cylindrical body 36 of the outlet portion of the apparatus is supported on the supports 32 and 34. Body portion 36 of the outlet portion of the apparatus has a pair of tube sheets or plates 38 and 40 secured to the opposite ends thereof in a rigid manner as by welding or the like.

An outlet portion 44 is in communication with the interior of the cylindrical body member 36, this outlet portion 44 in turn being connected with an outlet conduit 46 which extends through the wall 18 of the tank. It should be noted that the outlet portion 44 has been rotated 90 degrees in FIG. 3 solely for the purpose of illustration.

Figure 4:
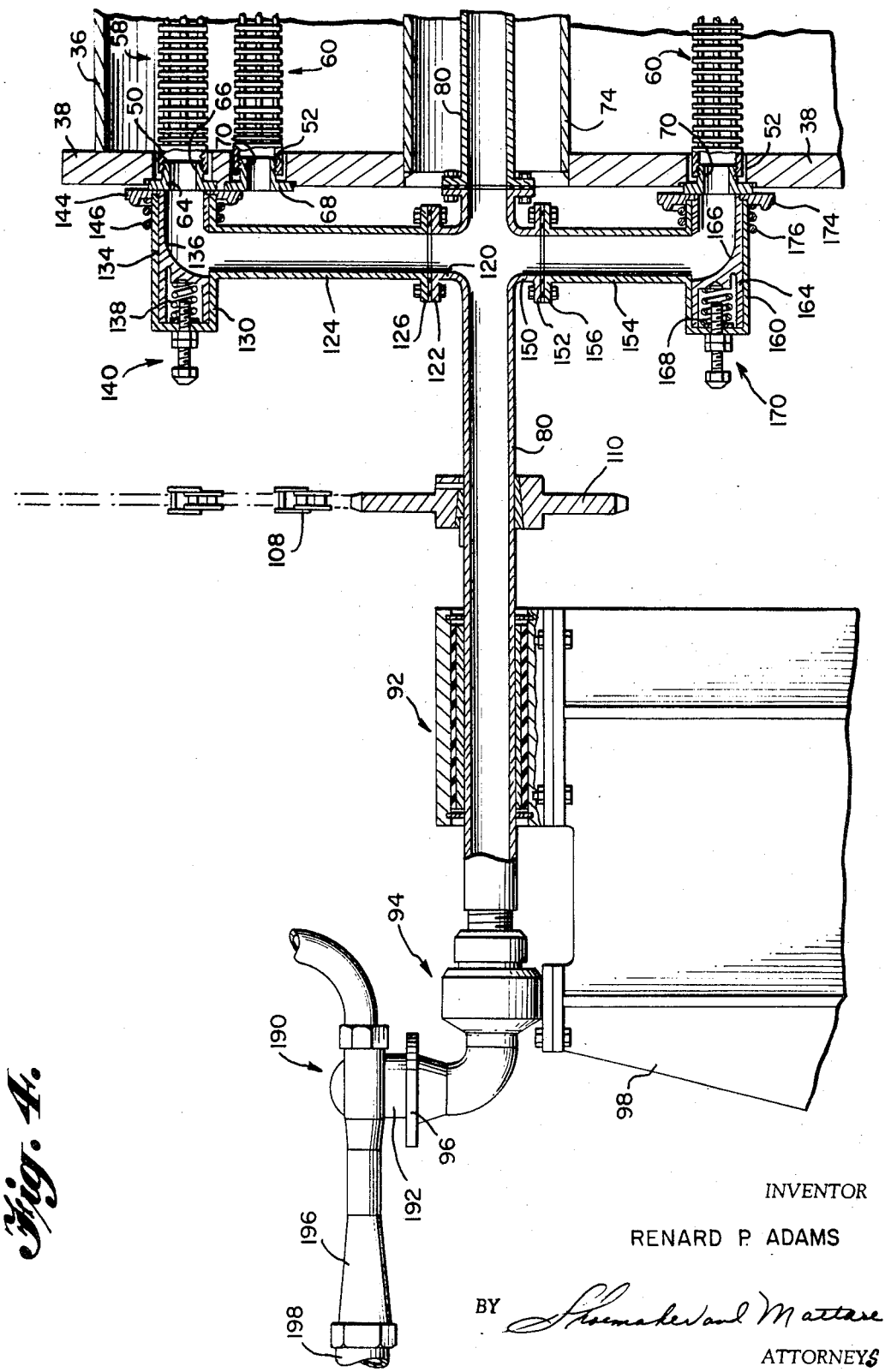
FIG. 4 is an enlarged vertical section through a portion of the structure shown in FIG. 3.

As seen most clearly in FIGS. 3 and 4, the annular tube plates 38 and 40 have a plurality of holes formed therein, these holes being of any suitable number so as to enable the desired number of filter tubes to be supported between the tube plates. It is apparent that the holes may be of any size so as to receive tubes of different diameter. The plate 38 has a first annular row of holes 50 formed therethrough and a second annular row of holes 52 formed therethrough. The opposite tube plate 40 similarly has a first annular row of holes 54 formed therethrough and a second annular row of holes 56 also formed therethrough.

Two annular rows 58 and 60 of filter tubes are disposed concentric with one another and are in staggered relationship so that they are not radially aligned with one another. Each of the filter tubes is of substantially cylindrical configuration and has discharged means formed therethrough substantially throughout the length thereof. The filter tubes may be of various constructions and may for example, comprise a Poro-Edge tube, manufactured by Edward E. Johnson Company, wherein trapezoidal wire is used having openings therebetween as small as .0005 inch. It is apparent that any suitable filter tube may be employed which is adapted to provide the necessary degree of separation.

The various filter tubes are disposed in substantially parallel relationship with one another, and the outer periphery of each tube is disposed a substantial distance from the outer periphery of an adjacent tube. While two annular rows of tubes are illustrated, any number of rows of tubes may be provided as desired, depending on the diameter of the outlet portion of the apparatus. On larger size arrangements, two rows of filter tubes may be back-washed at a time if so desired.

As seen most clearly in FIG. 4, the end portion of each of tubes 58 is provided with an internal thread, and an associated inlet port ring 64 which defines the inlet portion of the tube has a projection 66 extending therefrom having external threads formed thereon adapted to be threaded within the internal threads provided on the end of the associated filter tube. It should be understood that each of the filter tubes 58 is provided with a similar inlet port ring arrangement, it being noted that the outwardly facing surface of the inlet port extends beyond the outwardly facing surface of the tube plate 38.

Each of the filter tubes 60 similarly is provided with an internal thread at the end portion thereof, and an inlet port ring 68 associated with each of the filter tubes 60 has a projection 70 extending therefrom having external threads formed thereon which are threaded within the internal threads at one end of each of tubes 60. Here again, the outwardly facing surface of the inlet port ring 68 is positioned outwardly of the outwardly facing surface of tube plate 38 and in substantially the same plane as the outwardly facing surface of the inlet port ring 64 adjacent thereto as seen in the drawing.

It should be understood that similar inlet port rings are provided at the opposite ends of tubes 58 and 60, and these inlet port rings at the opposite ends of the tubes have been given the same reference numerals primed as seen in FIG. 3.

A generally cylindrical member 74 has the opposite ends thereof suitably secured to the annular tube plates 38 and 40. The outlet section of the filtering apparatus is defined between the tube plates 38 and 40, the cylindrical member 74 and the inner wall of the body member 36 to define an outlet portion of annular configuration. The outlet portion 44 previously described is in communication with this annular outlet portion.

The backwash means includes a longitudinally extending hollow portion 80 which as seen in FIG. 3 is rotatably supported at the right-hand end thereof by a cutless rubber bearing 82 or the like, the right-hand end of this hollow portion of the backwash means terminating in a swivel joint 84 which permits the portion 80 to rotate, while the flange portion 86 of the swivel joint remains stationary. Bearing 82 and the swivel joint 84 are supported upon a suitable bracket 88 which in turn rests upon the base portion 30 previously described.

In a similar manner, the left-hand end of the hollow portion 80 of the backwash means is rotatably journalled within a bearing 92 and terminates within a swivel joint 94 having a flange 96. Bearing 92 and the joint 94 are mounted upon a bracket 98 resting on the base portion 30.

The actuating or rotating means for operating the backwash means is mounted upon a bracket 100 supported by wall 20 of the tank. The actuating means includes a suitable driving means such as an electric motor 102 operatively connected with a speed reducer 104 which in turn has an output sprocket 106 connected with the output shaft thereof. A roller chain 108 connects the output sprocket 106 of the drive means with a sprocket 110 fixed to the hollow portion 80 of the backwash means for rotating the backwash means as desired.

It is noted that the extreme right-hand portion and left-hand portion of the hollow portion 80 of the backwash means may be detached from the central part thereof so as to assist in assembly and disassembly of the apparatus. As seen most clearly in FIG. 4, hollow portion 80 includes a radially outwardly extending portion 120 terminating in a flange 122. A further radially extending portion 124 of the backwash means terminates at one end in a flange 126 secured to the flange 122. A longitudinally extending sleeve portion 130 is provided at the outer end of the radially extending portion 124 and opens toward the tube plate 38 and the associated filter tubes.

A barrel member 134 having a bore 136 formed therein is slidably positioned within the sleeve portion 130. A compression spring 138 disposed within a suitable cavity provided in the barrel member 134 normally urges the barrel member toward the right as seen in FIG. 4 into engagement with the associated inlet portion 64 of an adjacent tube. Adjustment means 140 is provided for adjusting the force of spring 138.

This resiliently urged barrel member provides a close sliding fit to prevent leakage of water from the surrounding raw water disposed in the tank and into the backwash tube.

In addition, a seal plate means 144 is disposed in surrounding relation to the right-hand end of the sleeve portion 130 and is also adapted to engage the inlet portion 64 of the adjacent tube. A compression spring 146 is disposed in surrounding relation to the sleeve portion 130 as shown, and normally urges the seal plate means 144 to the right whereby the seal plate means is adapted to blank off the two tubes adjacent to the tube being backwashed so that there will not be any bypass of water from the raw water chamber into either of the two adjacent tubes and thence into the backwash barrel and to prevent adjacent tubes from bypassing raw water from the inside bore into the backwash barrel.

The hollow portion 80 of the backwash means includes a radially extending portion 150 diametrically opposite to the radially extending portion 120, portion 150 terminating in a flange 152. A further radially extending portion 154 of the backwash means terminates at one end in a flange 156 which is secured to the flange 152.

A longitudinally extending sleeve portion 160 is provided at the outer end of portion 154 of the backwash means, it being noted that the sleeve portion 160 is disposed at a distance from the portion 80 of the backwash means less than the sleeve portion 130. In this manner, the sleeve portion 130 is adapted to be aligned with the other annular row of filter tubes 58, while the sleeve portion 160 is adapted to be aligned with the inner annular row of filter tubes 60.

A barrel member 164 is slidably positioned within sleeve portion 160 and has a bore 166 formed therethrough. A spring 168 disposed within a cavity provided in barrel member 164 resiliently urges the barrel member to the right into engagement with the inlet portion of an adjacent filter tube 60. Suitable adjusting means 170 is provided for adjusting the force of spring 168.

A seal plate means 174 similar to the seal plate means 144 previously described is disposed in surrounding relationship to the sleeve portion 160 and is biased to the right by a compression spring 176 as illustrated. The seal plate means 174 acts in the same manner as the seal plate means 144 previously described so as to isolate one tube at a time for the backwashing procedure.

For the purpose of illustration, the sleeve portions of the backwash means are both illustrated as being aligned with a filter tube. In actual practice, the filter tubes are so staggered that the inner and outer sleeve portions are not simultaneously aligned with filter tubes in different annular rows of tubes. Accordingly, only one filter tube will be backwashed at any particular time.

The backwash means associated with the ends of the filter tubes at tube plate 38 have been described, and it will be noted that substantially identical backwash means is operatively associated with the opposite ends of the tubes at tube plate 40. This similar backwash structure provided at an axially spaced portion of the backwash portion 80 has been given the same reference numerals primed. It is of course understood that the opposite ends of a particular filter tube will be simultaneously aligned with the sleeve portions of the backwash means so that backwash will take place in opposite directions through a particular filter tube.

As seen most clearly in FIGS. 2 and 3, a conventional eductor 180 is provided with a suction portion 182 connected with the outlet from the swivel joint 84 at the flange 86 thereof. A conduit 184 is connected with a suitable source of liquid under pressure, and an electric operated valve may be connected in this conduit to enable the liquid under suitable pressure such as 60 lbs. to pass through the conduit and the eductor during the interval in which backwashing takes place. This high pressure liquid may come from the general high pressure pump service which picks up the liquid from the filter and delivers it to a distribution service.

A separate centrifugal pump may be employed using raw liquid from the raw liquid source to build up the necessary pressure which is used in the eductor. The liquid such as water would not actually be lost to the available water supply since the water can be returned to the pond, river or lake and the like from which the original water was withdrawn. The discharge 186 of the eductor is connected with a suitable discharge conduit portion which is adapted to discharge the liquid to waste or back to the source of raw liquid.

A similar eductor 190 is operatively connected with the opposite side of the backwash means. The suction portion 192 of the eductor 190 is interconnected with the swivel joint 94 at the flange 96 thereof. A pressure conduit 194 is connected with a suitable source of liquid under pressure, and the discharge 196 of the eductor is connected with a discharge conduit portion for removing the backwash liquid from the apparatus.

In operation, raw water for example flows into the tank through the inlet conduit 24 to a level as indicated by reference character L in FIGS. 2 and 3 to totally immerse the outlet portion of the apparatus in the raw water. The unfiltered water enters the ends of the filter tubes from both ends thereof under atmospheric pressure and will pass through the filter tubes into the annular outlet portion of the apparatus, and thence through the outlet conduit 46.

At frequent intervals, depending upon the pressure loss developed by the collection of solids, the backwash means will revolve, and through the induced suction created by the eductor means will draw liquid through the filter tube being backwashed and into the backwash means to be ejected to waste. An inductor means is provided for each of the two sides of the backwash means for more efficient operation of the apparatus.

I claim:

1. Filtering apparatus for removing contaminants from a liquid comprising an inlet portion and an outlet portion, an inlet conduit in communication with said inlet portion, an outlet conduit in communication with said outlet portion, a plurality of spaced filter tubes disposed within said outlet portion, the opposite ends of each of said tubes within said outlet portion being open to said inlet portion, backwash means movably supported adjacent said outlet portion, said backwash means being movable into position to be in communication with opposite ends of at least one of said tubes at a particular time, the backwash means being movable so as to be in communication with the opposite open ends of different ones of said filter tubes in a sequential manner, said backwash means including suction means for drawing liquid through an associated tube into the backwash means.

2. Apparatus as defined in claim 1 wherein said suction means comprises eductor means for inducing a vacuum in said backwash means.

3. Apparatus as defined in claim 1 wherein said suction means includes a pair of vacuum inducing means in communication with opposite sides of said backwash means and the opposite associated ends of a tube in said outlet portion.

4. Apparatus as defined in claim 1 wherein said inlet portion is substantially at atmospheric pressure, said suction means inducing a sub-atmospheric pressure in said backwash means.

5. Apparatus as defined in claim 1 wherein said inlet portion comprises a tank the upper portion of which is open to atmosphere, said outlet portion being supported within said inlet portion and being immersed in liquid disposed within the inlet portion during operation of the apparatus.

6. Apparatus as defined in claim 1 wherein said backwash means includes a plurality of longitudinally extending sleeve portions adapted to be disposed adjacent the inlet portions of said tubes, and seal plate means surrounding each of said sleeve portions and engaging an inlet portion of an associated tube to be backwashed to provide a seal therewith.

7. Apparatus as defined in claim 6 including resilient means normally biasing said seal plate means toward the associated inlet portions.

8. Apparatus as defined in claim 6 wherein said seal plate means engages the inlet portions of tubes adjacent to the tube being backwashed so as to block off the adjacent tubes and to prevent leakage into the backwash means.

9. Apparatus as defined in claim 6 including a barrel membed movably disposed within each of said sleeve portions for engagement with an associated tube inlet portion.

10. Apparatus as defined in claim 9 including resilient means normally biasing an associated barrel member into engagement with an associated tube inlet portion.

References Cited

UNITED STATES PATENTS 3,318,452  5/1967  Adams _____ 210—333

REUBEN FRIEDMAN, Primary Examiner

FRANK A. SPEAR, Jr., Assistant Examiner

U.S. Cl. X.R.

210—333